(12) United States Patent
Noguchi

(10) Patent No.: US 7,259,780 B2
(45) Date of Patent: Aug. 21, 2007

(54) IMAGE SENSOR WITH DESIGNATABLE READ-OUT RANGE

(75) Inventor: Yoshimitsu Noguchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 753 days.

(21) Appl. No.: 10/177,152

(22) Filed: Jun. 21, 2002

(65) Prior Publication Data

US 2002/0196351 A1    Dec. 26, 2002

(30) Foreign Application Priority Data

Jun. 22, 2001 (JP) .............................. 2001-189802

(51) Int. Cl.
*H04N 5/225* (2006.01)
*H04N 3/14* (2006.01)
*H04N 5/335* (2006.01)

(52) U.S. Cl. ................. 348/207.11; 348/312; 348/322; 348/320

(58) Field of Classification Search ........... 348/207.11, 348/316, 317, 211.99, 211.3, 39, 211.14, 348/302, 311–312, 207.1, 552, 320, 322, 348/231.2, 207.99
See application file for complete search history.

(56) References Cited

U.S. PATENT DOCUMENTS

| 4,810,901 | A | * | 3/1989 | Yamada ...................... 327/515 |
| 4,881,127 | A | * | 11/1989 | Isoguchi et al. ............. 348/296 |
| 5,339,162 | A | * | 8/1994 | Tani ........................... 348/298 |
| 5,777,670 | A | * | 7/1998 | Sawanobori et al. ........ 348/311 |
| 5,914,728 | A | * | 6/1999 | Yamagishi et al. .......... 345/565 |
| 5,978,020 | A | * | 11/1999 | Watanabe et al. ...... 348/207.99 |
| 6,084,634 | A | * | 7/2000 | Inagaki et al. .............. 348/294 |
| RE36,812 | E | * | 8/2000 | Tani ........................... 348/298 |
| 6,493,025 | B1 | | 12/2002 | Kiriyama et al. |
| 6,677,989 | B1 | * | 1/2004 | Aizawa et al. ........... 348/207.1 |
| 6,924,796 | B1 | * | 8/2005 | Someya et al. ............. 345/213 |
| 6,927,790 | B2 | * | 8/2005 | Chandler ............... 348/211.99 |
| 2003/0052976 | A1 | * | 3/2003 | Harada et al. ........... 348/220.1 |

FOREIGN PATENT DOCUMENTS

| JP | 09-102906 | | 4/1997 |
| JP | 2000-253381 | | 9/2000 |
| JP | 2000253381 | A * | 9/2000 |

* cited by examiner

*Primary Examiner*—Ngoc-Yen Vu
*Assistant Examiner*—Gregory Madden
(74) *Attorney, Agent, or Firm*—Hogan & Hartson LLP

(57) ABSTRACT

A compact, energy efficient image sensor which enables transfer of images to an external system is made compact in size and low in power consumption comprises an image sensor control circuit 20 which operates to drive a CCD image sensor 4 and stores horizontal lines of image data in a line memory 30. An HREF signal is raised in association with the storing operation. The external system monitors the HREF and supplies an external clock EXCLK to an image sensor 2 during an H level period according to its convenience. A memory control circuit 34 sequentially outputs image data from the line memory 30 to a data bus 10 in pixel units and in synchronization with the EXCLK.

6 Claims, 6 Drawing Sheets

IMAGE SENSOR WITH DESIGNATABLE READ-OUT RANGE

BACKGROUND OF THE INVENTION

1. Field of the Invention

The present invention relates to an image sensor which relays image information to an external device.

2. Description of the Related Art

There is a known conventional system in which an image sensor such as a digital camera, a scanner, or the like connected to an external device, such as a computer, relays information collected by the image sensor to the external equipment which operates asynchronous to the image sensor.

In one known structure for such a system, image information is transferred from the image sensor to external equipment while the image sensor captures images and outputs image data obtained by the image pickup based on a control timing generated by the image sensor. In this structure, the image sensor outputs digital image data in units of frames or horizontal lines. Specifically, the image sensor continuously outputs a single frame or a single horizontal line of image data according to a self-generated clock. With this configuration, although the external equipment can instruct the start of reading of image data from the image sensor, once the image sensor has started to output image data, the external equipment cannot readily halt or otherwise control the output of data.

Here, the external equipment, often a device such as a computer, may perform other processing while it receives image data from the image sensor. For example, the device may perform priority processing such as interruption processing or the like. Also, the image sensor is generally configured to be connected to a common bus for the external equipment, and this bus might be used for transmission of data other than that for the image information. Therefore, the structure of an image sensor which unilaterally outputs image data is not preferable for the external equipment. Of special note is the fact that, in this system, the image sensor always outputs image data in frame or line units, even when all that is desired is retrieval of a partial region of data from among the data for a single frame of an image. As a consequence, the external equipment can only send a data reading trigger to the image sensor when its CPU (Central Processing Unit) or bus is free, which occurs only at a certain times, such as after a single frame period or a single horizontal scanning period or more.

In an attempt to solve this problem, there has been proposed a structure in which a frame memory is mounted on the image sensor to temporarily store a single frame of image data obtained by a solid-state image sensor. In this structure, an operation to read an information charge from the solid-state image sensor to store in the frame memory can be performed according to the control timing and control clock generated by the image sensor independent of the state of the external equipment, while the external equipment can access the frame memory of the image sensor according to its own processing stat and the state of usage of the bus, and can read just a desired region of data from a single frame of an image.

However provision of a frame memory is disadvantageous in that the cost of the image sensor increases. There are also problems that it is difficult to reduce the size and the power consumption of the image sensor.

SUMMARY OF THE INVENTION le;.5qAn object of the invention to provide an image sensor, which can easily transfer image data to external equipment operating asynchronously to the drive of a solid-state image sensor, which is low in costs, and which can be made compact and energy efficient.

The image sensor according to the present invention comprises a solid-state image sensor which includes an image pickup section which is comprised of a plurality of light receiving pixels arranged in matrix, and accumulates information charges generated by the respective light receiving pixels in response to incident light forming a subject image, a vertical transfer section which takes in and holds the information charges accumulated in the respective light receiving pixels of the image pickup section in a single screen unit and transfers in a vertical direction in a single line unit, and a horizontal transfer section which transfers in a horizontal direction and outputs the information charges which are transferred and output from the vertical transfer section; a solid-state image sensor control circuit for controlling the operation of the solid-state image sensor; a line memory for storing image data, which corresponds to the picture signal output from the solid-state image sensor, in a single line unit; and a memory control circuit for reading the image data, which is to be stored in the line memory, by one pixel at a time according to the clock supplied from external equipment and outputting it to the external equipment; the memory control circuit reading a designated range of image data from the line memory according to a parameter which designates a read-out range.

According to the present invention, the external equipment does not normally control the driving of the solid-state image sensor, which is independently controlled by the image sensor. Thus, one line of image data is sequentially output from the solid-state image sensor and stored in the line memory. Meanwhile, the external equipment controls the reading of the image data stored in the line memory. The external equipment supplies a clock to the image sensor, and the image data is read in pixels from the line memory in synchronization with that clock. For example, when the load from other processing by the external equipment becomes high such that the external equipment can no longer readily receive image data, or when a bus for connecting the image sensor and the external equipment is being used for another data transmission, the external equipment can stop the clock to discontinue the retrieval of data. Then, when the circumstances inhibiting data reading are resolved, the clock supply is resumed, and reading can be resumed. Thus, the external equipment can read a designated region of the image data in the single screen in compliance with the state of the external equipment. The designated region can be expanded in both vertical and horizontal directions. The memory control circuit of the invention can read the designated horizontal region of image data belonging to the above designated region in the single line of image data stored in the line memory. For a designated horizontal region, an entire single horizontal line or a segment may be designated. For example, the designated horizontal region can be designated by an address of its first pixel (number of pixels) and an address of its end pixel (number of pixels) or by the address of the first pixel and the range length (number of pixels contained in the range). The memory control circuit can read a designated vertical range of image data belonging to the above designated range in the single screen of image data stored within the line memory in a single line unit. The designated vertical range can also be determined in the same way as in the horizontal direction. Information for determining the designated range may be predetermined and stored in the image sensor or may be configured in such a way that a set value can be changed by the external equipment as required.

In the image sensor according to another aspect of the invention, the memory control circuit outputs a line read-out state signal which indicates whether it is in a read-out period of image data belonging to the designated horizontal range; and the solid-state image sensor control circuit suspends the transfer operation which is performed by the vertical transfer section and the horizontal transfer section when the line read-out state signal indicates that it is the read-out period.

According to the invention, the external equipment reads from the line memory according to its circumstances. Therefore, it cannot be assured that the reading operation will be synchronized with the drive of the solid-state image sensor, being the transfer operation which is performed at a cycle of a single horizontal scanning period in the vertical transfer section and the horizontal transfer section. Specifically, the contents of the line memory are updated for every single horizontal scanning period by the driving of the solid-state image sensor but the external equipment might not have completed reading of the designated range of image data related in the horizontal direction in the single horizontal scanning period. When this occurs, the present invention suppresses the update of the contents of the line memory and can also request the external equipment to continue reading of the contents of the present line memory to complete the reading.

The image sensor according to another aspect of the invention, the sensor control circuit discharges the information charge remaining in the vertical transfer section if the output to the external equipment of all horizontal lines of the image data contained in the designated range in the single screen does not complete within a predetermined frame rate.

According to the invention as described above, when the external equipment controls the reading of image data from the line memory, it may not be possible to retrieve all desired image data desired at the frame capture rate of the solid-state image sensor, which is referred to in this specification simply as the "frame rate". In such a case, the present invention discharges the information charges which have not yet been output to the vertical transfer section of the solid-state image sensor and transfers the information charges from the image pickup section to the vertical transfer section. In other words, emphasis is here placed on capturing a new image at a fixed frame. For example, when a designated range in the vertical direction is output to the external equipment and then the information charges of the subsequent horizontal lines other than the designated range are sequentially output by one horizontal line at a time from the solid-state image sensor, the output processing might not be completed within one frame of the frame rate. In such a case, the present invention can maintain a desired frame rate by simultaneously removing the information charges which have been remained in the vertical transfer section.

In the image sensor according to another aspect of the invention, the solid-state image sensor control circuit stops the transfer of information charges from the image pickup section to the vertical transfer section if the output to the external equipment of all horizontal lines of the image data contained in the designated range in the single screen does not complete within a predetermined frame rate.

According to the invention, the external equipment controls the reading of image data from the line memory, but all the image data desired to be retrieved might not be read at the frame rate of the solid-state image sensor. For example, there are situations where the transfer operations by the vertical transfer section and the horizontal transfer section of the solid-state image sensor may be postponed as described above. In such situations, the present invention suppresses the transfer of the information charges from the image pickup section to the vertical transfer section to store the information charges which have not been output to the vertical transfer section of the solid-state image sensor, and continues the reading of the remaining information charges. In other words, output of the pictured image data to the external equipment is prioritized over the capturing of a new image at a prescribed frame rate.

In the image sensor according to another aspect of the invention, the memory control circuit controls read-out timing by the clock of the external equipment only for the horizontal lines contained in the designated range in the single screen.

According to the invention, the designated range in the vertical direction where image data desired to be retrieved by the external equipment is predetermined in the image sensor or determined or changed from the external equipment. The external equipment supplies a clock to the image sensor, and the memory control circuit can output from the line memory according to the clock. Control by the memory control circuit is effective only in the designated range and, for the horizontal line outside the designated range, processing of the image data by the image sensor is primarily based on the operation of the solid-state image sensor control circuit, regardless of the presence or absence of the supply of clock from the external equipment. For example, the contents of the line memory are automatically updated in a cycle of single horizontal scanning period. The designated range may be all horizontal lines which form a single frame, or just a certain portion of such horizontal lines. For example, the designated range can be designated by its first line address (number of lines) and the end line address (number of lines), or can be designated by the first line address and the range length (number of lines contained in the range). The designated range in the vertical direction can be designated as one or a plurality of lines within an image. Information for determining the designated range may be preset in the image sensor, or the system may be configured enable resetting of the value as desired.

DESCRIPTION OF THE PREFERRED EMBODIMENT

The preferred embodiment of the present invention will be described with reference to the accompanying drawings.

Figure 1:
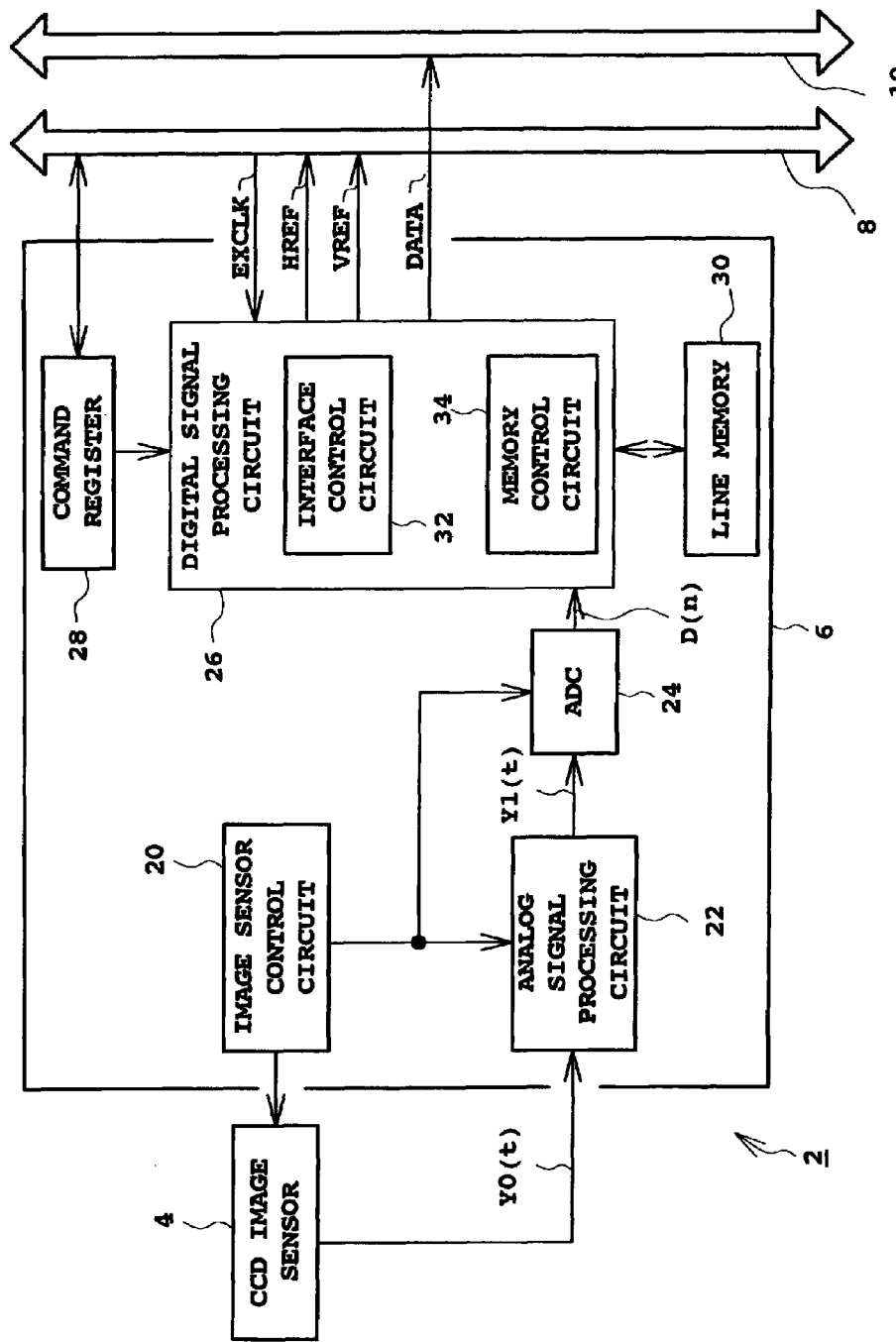
FIG. 1 is a block diagram schematically showing a structure of an image sensor according to an embodiment of the present invention.

FIG. 1 is a block diagram schematically showing a structure of the image sensor according to an embodiment of the present invention. This invention can also be applied to an image sensor which adopts a CCD image sensor of a frame transfer type or an inter-line type. An example image sensor adopting the CCD image sensor of the frame transfer type will be described below. This image sensor 2 includes a frame transfer type CCD image sensor 4 and a drive section 6 and is connected to a control bus 8 and a data bus 10. The image sensor 2 is connected to an external system (not shown), such as a computer, through these buses 8, 10.

The CCD image sensor 4 comprises an image pickup section, a storage section as a vertical transfer section, and a horizontal transfer section. The image pickup section has a plurality of light receiving pixels arranged in row and column directions, and each light receiving pixel generates and accumulates information charges according to the amount of light in each light receiving pixel of the subject image projected to the image pickup section. The image pickup section transfers the information charges accumulated in the plurality of light receiving pixels to the storage section at a high data transfer rate. The storage section takes in information charges for a single screen, which are transferred for output from the image pickup section, temporarily stores them, and transfers the charges sequentially in vertical line units. The horizontal transfer section receives information charges for a single line, which are transferred for output from the storage section, in order to transfer them in the horizontal direction and sequentially output data in units of one pixel.

The drive section 6 comprises of an image sensor control circuit 20, an analog signal processing circuit 22, an ADC (analog-to-digital converter) 24, a digital signal processing circuit 26, a command register 28, and a line memory 30. The digital signal processing circuit 26 in turn comprises an interface control circuit 32 and a memory control circuit 34.

The image sensor control circuit 20 includes the image pickup section, the storage section, the horizontal transfer section, an output section and a timing control circuit, which performs timing control of a driver for driving a substrate potential and an output pulse of the driver, of the CCD image sensor 4. Specifically, the image sensor control circuit 20 performs, for example, high speed frame transfer of the information charges from the image pickup section to the storage section, line feed transfer to transfer a single horizontal line at a time from the storage section to the horizontal transfer section, and horizontal transfer to sequentially transfer the information charges, which are transferred to the horizontal transfer section, to the output section.

The image sensor control circuit 20 performs an electronic shutter operation according to exposure information generated by the digital signal processing circuit 26 to control exposure time in the image pickup section. Specifically, the image sensor control circuit 20 controls extension or shortening of the accumulation period of the information charges in the image pickup section according to an average level of the picture signals output from the CCD image sensor 4. For example, control is performed according to integration data indicating the integral value of a full (one) image or of any partial region supplied from the digital signal processing circuit 26 to decide discharge timing of the information charges to be accumulated in the image pickup section of the CCD image sensor 4. At this point, a discharge pulse is generated in such a manner that, when integration data supplied from the digital signal processing circuit 26 becomes larger than a certain value, the discharge timing is delayed to decrease the accumulation period of the information charges, and when it becomes smaller than that value, the discharge timing is advanced to increase the accumulation period. Thus, feedback control is performed to provide an appropriate accumulation period according to the luminance of a subject.

The image sensor control circuit 20 can also apply a discharge pulse in the same way as the electronic shutter operation to perform a reset operation of the storage section to discharge at once the information charges from the storage section to the back side of the substrate. The timing of the reset operation of the storage section will be described below.

The analog signal processing circuit 22 performs processing such as correlated double sampling (CDS), auto gain control (AGC) or the like of a picture signal $Y0(t)$ output from the CCD image sensor 4, and outputs a waveform-shaped picture signal $Y1(t)$. The analog-to-digital converter (ADC) 24 converts the picture signal $Y1(t)$ by one pixel at a time into a digital signal to generate image data $D(n)$. The processing by the analog signal processing circuit 22 and the ADC 24 is performed in synchronization with the output by the CCD image sensor 4, and the signal used for the synchronization is generated by the analog signal processing circuit 22.

The digital signal processing circuit 26 performs color separation, matrix operation, white balance adjustment, and the like on the image data $D(n)$, to generate luminance data $Y(n)$ and color difference data $U(n)$, $V(n)$. The line memory 30 stores the image data $D(n)$, which results from the A/D conversion of the picture signal $Y1(t)$, for one horizontal line. The line memory 30 is comprised of for example an SRAM and can be accessed at random.

The command register 28 stores various commands supplied from the external system through the control bus 8, and determines the processing conditions of the digital signal processing circuit 26.

The interface control circuit 32 performs transmission and reception of a signal and transmission of data between the external system and the image sensor 2.

The memory control circuit 34 controls writing or reading of data into or from the line memory 30.

Figure 2:
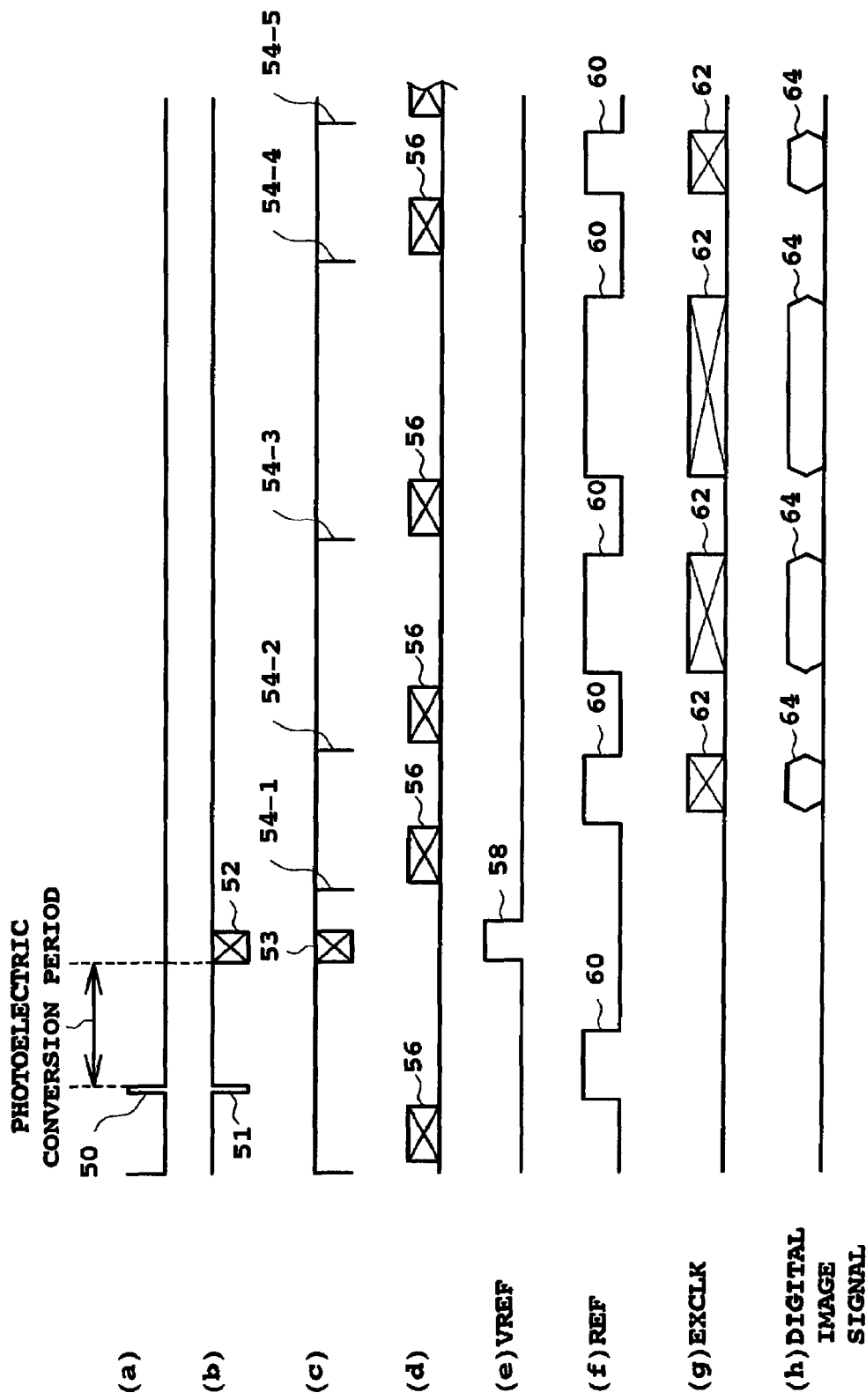
FIG. 2 is a timing chart illustrating a basic operation of the image sensor according to the embodiment of the present invention.

An operation of the image sensor 2 will be described. FIG. 2 is a timing chart illustrating a basic operation of the image sensor 2. FIGS. 2(a) to (d) show timing of a pulse to be applied to each section of the CCD image sensor 4. FIG. 2(a) shows a discharge pulse 50 which is applied to the substrate of the CCD image sensor 4 at the operation of the electronic shutter. FIG. 2(b) shows drive pulses of the image pickup section, namely a pulse 51 to be applied in combination with the discharge pulse 50 and a frame transfer clock pulse 52 to be applied to a transfer electrode of the image pickup section at the time of the frame transfer. FIG. 2(c) shows drive pulses of the storage section, namely a frame transfer clock pulse 53 to be applied to the transfer electrode of the storage section at the time of the frame transfer and a line feed clock pulse 54 to be applied to the transfer electrode of the storage section at the time of the line feed. FIG. 2(d) shows a horizontal transfer clock pulse 56 to be supplied to the horizontal transfer section. FIG. 2(e) shows a signal VREF which indicates timing of the frame transfer, which becomes H level according at the generation period of the frame transfer clock pulse 52 and L level at other times. A VREF pulse 58 is generated in the digital signal processing circuit 26 and output to the external system through the interface control circuit 32 and the control bus 8. The external system can understand the start of the vertical scanning period from the VREF. FIG. 2(f) is a signal HREF indicating a state wherein the external system can read image data, and the external system is allowed to read image data from the line memory 30 during an H level period of the HREF but inhibited from reading during an L level period. An HREF pulse 60 is also generated by the digital signal processing circuit 26 and output to the external system through the interface control circuit 32 and the control bus 8. FIG. 2(g) shows an external clock EXCLK 62 which is input from the external system to the digital signal processing circuit 26 through the control bus 8. Image data is read in from the line memory 30 in pixel units and in synchronization with the EXCLK, as described below. FIG. 2(h) shows a digital picture signal 64 which is read from the line memory 30 in cooperation with the EXCLK and output from the image sensor 2. The external system obtains the digital picture signal through the data bus 10.

The image sensor control circuit 20 generates a frame transfer clock pulse 52 at a prescribed frame rate to perform frame transfer. Thus, the information charges, which are generated in correspondence with a subject image in the image pickup section of the CCD image sensor 4 between the end timing of the discharge pulse of the electronic shutter operation and the start of the frame transfer, are transmitted to the storage section, and a new image is stored in the storage section. The image stored in the storage section is output from the CCD image sensor 4 in horizontal line units according to the line feed clock pulse 54 for performing the line feed transfer and the subsequent horizontal transfer clock pulse 56, and input to the digital signal processing circuit 26 through the analog signal processing circuit 22 and the ADC24. Before performing processing such as the above-described color separation of the input single horizontal line of image data, the digital signal processing circuit 26 stores the single horizontal line of the image data after the processing into the line memory 30 under control of the memory control circuit 34. At the same time, the digital signal processing circuit 26 raises the HREF signal from the L level to the H level.

The external system detects that the HREF signal has become H level and accordingly registers that it is free to output the EXCLK 62, which is input to the memory control circuit 34 through the interface control circuit 32. For example, the memory control circuit 34 sequentially reads image data from the prescribed pixel (first read-out pixel) of the single horizontal line of image data stored in the line memory 30 one pixel at a time for each input EXCLK pulse. The image data becomes the digital picture signal 64.

Specifically, the external system controls reading of the image data from the line memory 30 according to the EXCLK. Here, the external system generates each EXCLK pulse at a timing at which it is capable of receiving image data from the image sensor 2 according to the CPU processing load or the state of traffic through the data bus 10. Thus, the pulse train of the EXCLK 62 is not always constant. For example, when the external system is in a situation wherein other processing places a high load on the system, generation of the EXCLK pulse may be temporarily halted, and when the high load situation abates, generation of the EXCLK pulse is resumed. Therefore, the period between the start and end of the EXCLK 62 may very even when the same number of pixels of image data is read for each horizontal line. The memory control circuit 34 counts the number of EXCLK pulses input after the HREF signal has become H level to detect that a prescribed number of pixels of image data is read. The digital signal processing circuit 26 drops the HREF signal to the L level in association with this detection.

The image sensor control circuit 20 performs, as a basic operation, the line feed transfer and horizontal transfer (namely, generation of the line feed clock pulse 54 and the horizontal transfer clock pulse 56) for every prescribed single horizontal scanning period and sequentially outputs image data from the CCD image sensor 4 in horizontal line units. However, when the HREF signal is at the H level after a lapse of the single horizontal scanning period, the image sensor control circuit 20 suppresses both line feed and horizontal transfer. For example, as shown in FIG. 2, clock pulses 54-2 and 54-5 for the second and fifth line feed transfer are generated from the previous pulses 54-1 and 54-4 after a single horizontal scanning period, but the clock pulses 54-3 and 54-4 for the third and fourth line feed transfer are delayed until the HREF becomes L level and are generated from the previous pulses 54-2 and 54-3 after a time longer than a single horizontal scanning period has elapsed.

The reading out of image data from the line memory 30 is performed according to a parameter designating a reading-out range in the form of a first pixel and an end pixel or a number of read-out pixels predetermined in the command register 28 or the register contained in the memory control circuit 34. This predetermined value can be varied according to instruction data input from the external system through the control bus 8. In this example, the set value and the instruction data designate the first pixel and the end pixel or the first pixel and the number of read-out pixels. Thus, it is possible to read just a partial range of the single horizontal line, to store a plurality of designated ranges in the register contained in the command register 28 or the memory control circuit 34, and to read image data for a plurality of designated ranges within the single horizontal line. Naturally, it also possible to read all the data for the single horizontal line.

The external system can count the HREF pulse 60 after the generation of the VREF pulse 58 to determine the line number of the horizontal line which is being read at that time.

Figure 3:
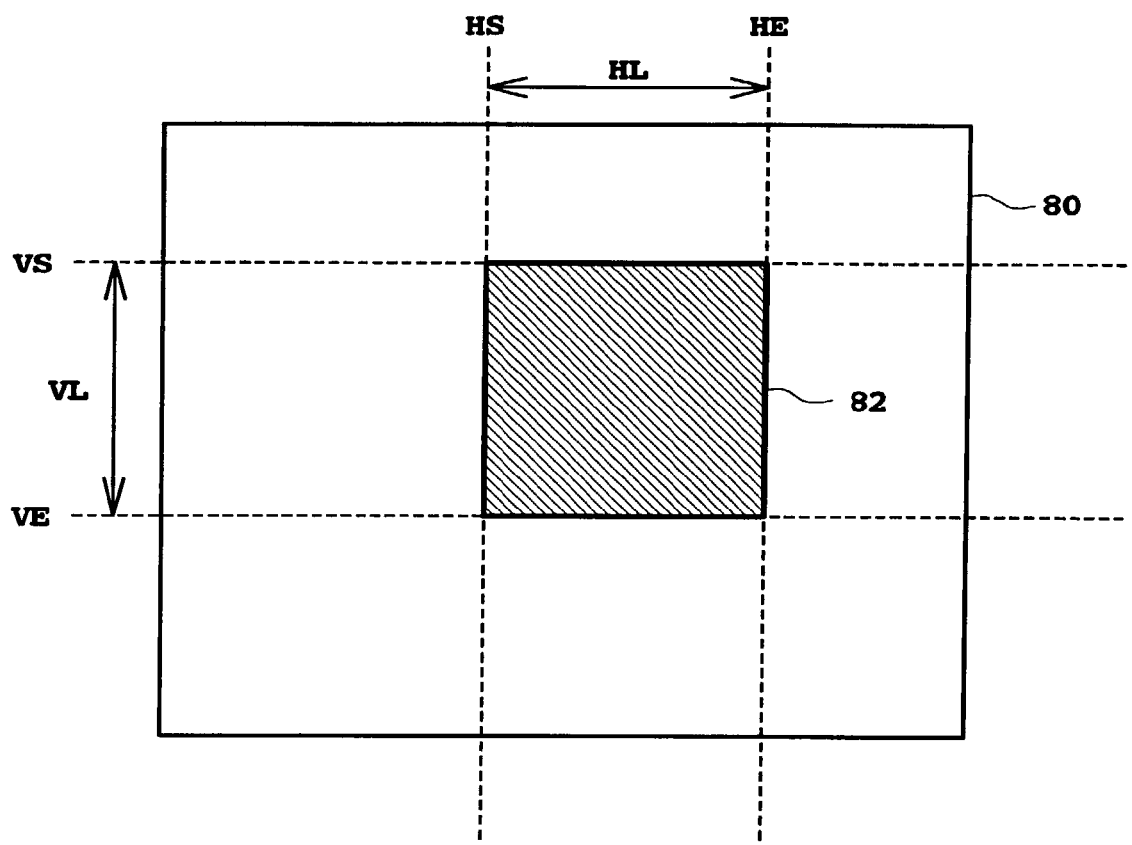
FIG. 3 is a schematic diagram of an image for illustrating a designated range of reading of image data from the image sensor according to the embodiment of the present invention.

The range of image data to be read from the image sensor 2 can be designated not only in the above-described horizontal direction but also in the vertical direction. FIG. 3 is a schematic diagram of an image for defining a designated range of image data in both the horizontal and vertical directions. In the drawing, a rectangular region 82 in an image 80 is shown as an example of the designated range. For example, as a parameter to designate the range of the rectangular region 82, a designated horizontal range, which is indicated by a read-out first pixel HS and an end pixel HE or the first pixel HS and the number of read-out pixels HL, is determined in the horizontal direction. For the vertical direction, a designated vertical range, which is indicated by a vertical take-in start line number VS and a take-in end line number VE or the take-in start line number VS and the number of take-in lines VL, is determined.

Figure 4:
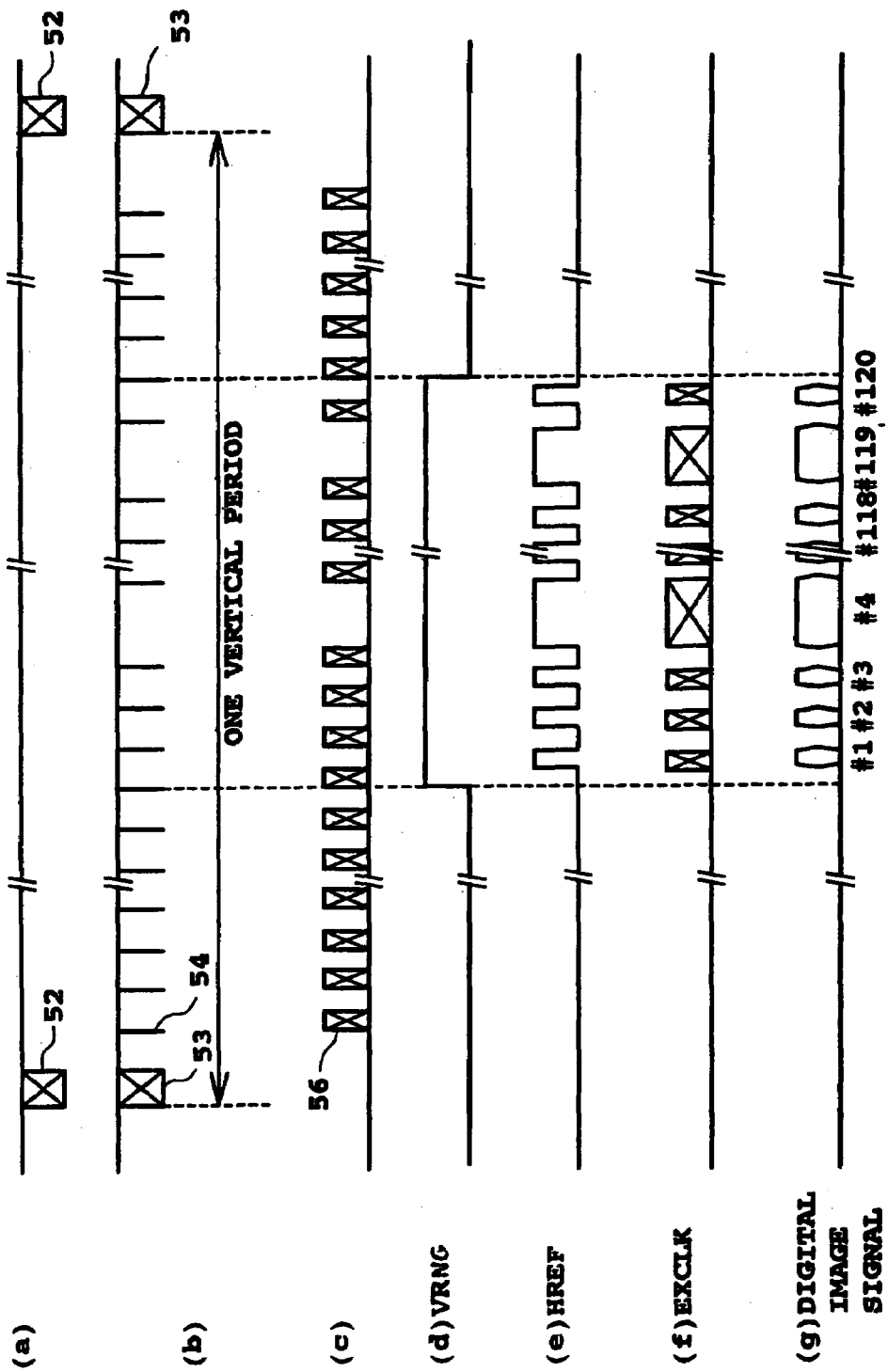
FIG. 4 is a timing chart illustrating an operation mode for retrieving just a designated vertical range of image data according to a first example of an operational mode of the embodiment of the present invention.

FIG. 4 is a timing chart illustrating an operation of capturing an image when the designation range is determined in the vertical direction of the image sensor 2. FIG. 4(a) shows a drive pulse of the image pickup section and the frame transfer clock pulse 52 which is applied to the transfer electrode of the image pickup section at the time of frame transfer. FIG. 4(b) shows a drive pulse of the storage section and the frame transfer clock pulse 53 and the line feed clock pulse 54. FIG. 4(c) shows the horizontal transfer clock pulse 56. FIG. 4(d) shows a signal VRNG indicating the vertical period which can be read by the external system, FIG. 4(e) shows the HREF pulse 60, FIG. 4(f) shows the external clock EXCLK 62, and FIG. 4(*g*) shows the digital picture signal 64. FIG. 4 illustrates a state wherein the external system retrieves only 120 lines from among all of the horizontal lines. A plurality of parameters to designate the range in the vertical direction are determined in the digital signal processing circuit 26. These parameters are, for example, the take-in start line number VS and the number of take-in lines VL as shown in FIG. 3. These VS and VL can be set in the digital signal processing circuit 26 from the external system.

The digital signal processing circuit 26 counts the line feed transfer operation or horizontal transfer operation which is performed by the image sensor control circuit 20 with reference to the frame transfer, and, when an operation in which the VSth horizontal line is output from the CCD image sensor 4 is detected, the VRNG signal is raised to the H level. While the VRNG signal is at H level, the digital signal processing circuit 26 can generate the HREF pulse. When it is detected that the operation of transferring the (VS+VL−1)th horizontal line to the external system has completed, the digital signal processing circuit 26 drops the VRNG signal to the L level, thereby prohibiting generation of the HREF pulse. Thus, the HREF pulse is generated for VL lines from the VSth horizontal line, and the external system can generate EXCLK for only such lines, to thereby retrieve only the desired image data.

When the VRNG is at the H level, the digital signal processing circuit 26 controls the timing of the drive operation of the image sensor control circuit 20 according to the reading operation driven by the EXCLK of the external system. When the VRNG is at the L level, the image sensor control circuit 20 operates without being influenced by the external system and outputs the horizontal line, which is not read out by the external system, from the CCD image sensor 4. Conversely, while the VRNG is at the L level, the external system need not control the image sensor 2.

The designated range in the vertical direction can be that of an entire single frame, and the designated range in a plurality of vertical directions can be determined in one frame. The present invention may be so configured that, when the designated range is determined in a plurality of vertical directions, a set of parameters VS, VL corresponding to the respective designated ranges is pre-stored in the command register 28 or in the memory or the register provided in the interface control circuit 32, and the parameters are sequentially read for use. The present invention can also be configured such that when the external system terminates taking one designated vertical range, a parameter of the next designated vertical range can be determined.

Thus, the external system monitors the VREF and the HREF, and inputs the EXCLK to the image sensor 2 so that it can easily read image data from the image sensor 2 at a timing appropriate for the external system and obtain image data for a desired region within one frame of an image. Meanwhile, the external system need not perform the drive control of the CCD image sensor 4, such as a frame transfer, line feed transfer, horizontal transfer, electronic shutter operation or the like because such control is automatically performed by the image sensor 2. Specifically, when the HREF signal is in the period of the L level, the image sensor 2 operates according to the inside clock, and the output control of image data from the CCD image sensor 4 is mainly performed by the image sensor 2. When the HREF signal is in an H level period, output of image data to the external system by the image sensor 2 is primarily controlled by the external system according to the external clock EXCLK. Any timing differences between the output control of image data from the CCD image sensor 4 by the image sensor 2 and the input control of image data by the external system are absorbed by the line memory. Thus, a low cost, compact image sensor 2 with reduced power consumption can be realized.

Figure 5:
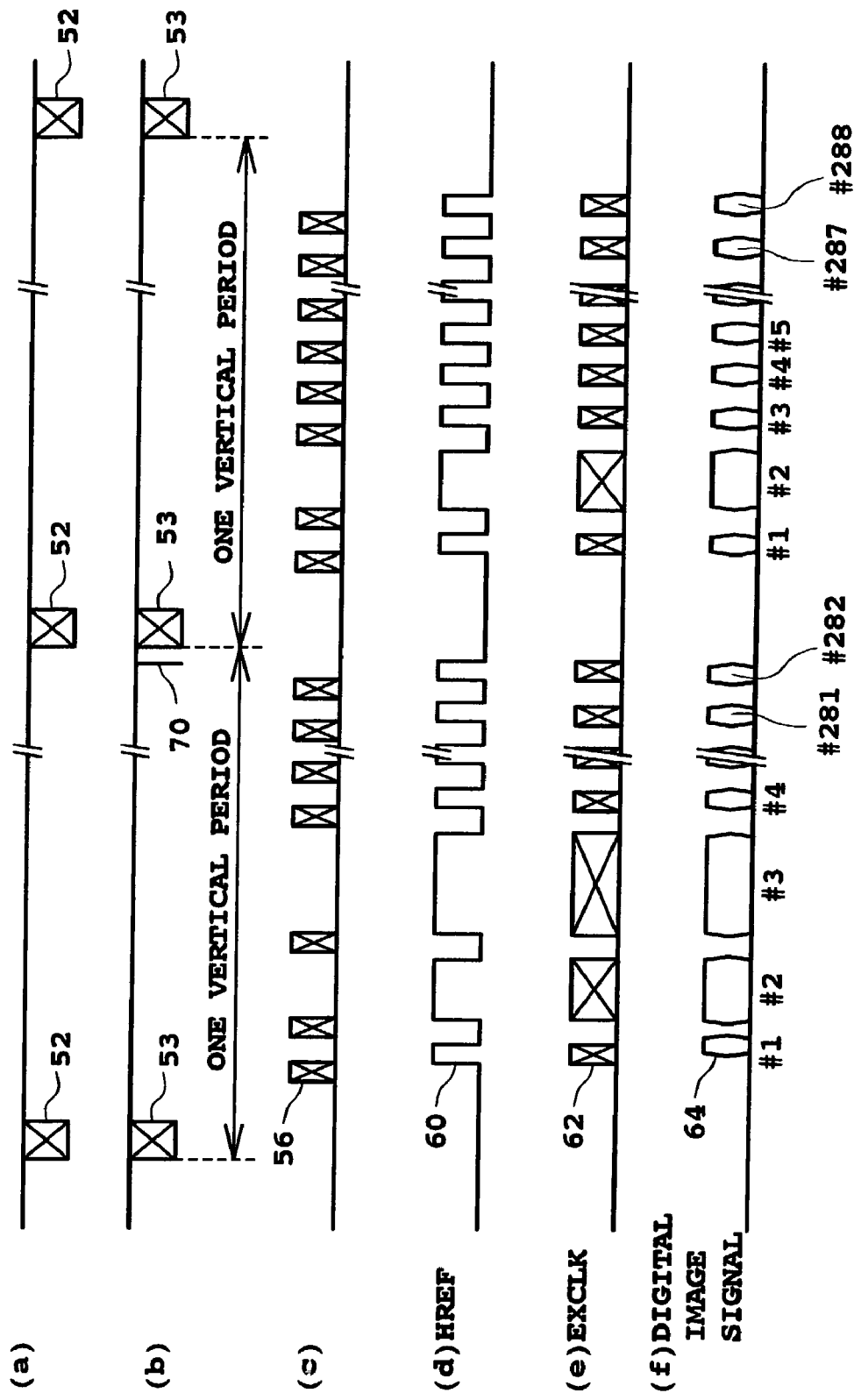
FIG. 5 is a timing chart illustrating a frame rate priority mode according to a first example operational mode of the embodiment of the present invention.

FIG. 5 is a timing chart illustrating a frame rate priority mode as a first example application of the image sensor 2. This mode and a further example application to be described below have portions in common with the basic operation as described above. The following descriptions of the features of the applications is based on the above-described basic operation.

FIG. 5(*a*) shows the frame transfer clock pulse 52 to be supplied to the image pickup section of the CCD image sensor 4. FIG. 5(*b*) shows timing of a drive pulse to be supplied to the storage section of the CCD image sensor 4. A frame transfer clock pulse 53 and a discharge pulse 70 are applied to the storage section for the reset operation of the storage section. The discharge pulse 50 of an electronic shutter and the clock pulse 54 for the line feed transfer are not shown. FIG. 5(*c*) shows a horizontal transfer clock pulse 56. FIG. 5(*d*) shows the HREF pulse 60, FIG. 5(*e*) shows the external clock EXCLK 62, and FIG. 5(*f*) shows the digital picture signal 64. FIG. 5 shows two vertical scanning periods when all the horizontal lines are 288 lines, and "#k" shown below the digital picture signal 64 indicates that it is the output of the kth line.

In this operation mode, the CCD image sensor 4 is driven to maintain a prescribed frame rate. Specifically, the image sensor control circuit 20 outputs the frame transfer clock pulse 52 each single vertical scanning period. Meanwhile, timing of the output from the CCD image sensor 4 of each horizontal line varies according to the processing of the external system when it reads image data from the line memory 30 as described above, and therefore does not necessarily conform to a prescribed cycle. Therefore, it is not necessarily true that all horizontal lines can be output from the CCD image sensor 4 in a single vertical scanning period. In the present operation mode, the next new image can be captured, even when all the horizontal lines cannot be read in the single vertical scanning period.

For example, in FIG. 5 shows reading-out is limited to up to the 282nd line within a first vertical scanning period, but the next frame transfer clock pulse 52 is produced, and a new image is stored from the image pickup section to the storage section. Here, it is not preferable to perform the frame transfer when the information charges of all horizontal lines are not being output from the storage section, namely a state that unoutput information charges remain in the storage section. Therefore, the discharge pulse 70 is supplied to the storage section prior to the frame transfer clock pulse 52 to perform the reset operation of the storage section so to discharge the information charges remained in the storage section by the same principle as the electronic shutter. Meanwhile, the output of all the horizontal lines has completed in a second vertical scanning period, and the storage section reset operation is unnecessary and therefore not performed. The digital signal processing circuit 26 determines the number of lines output from the CCD image sensor 4 after the generation of the frame transfer clock pulse 52, and based on that number judges whether the discharge pulse 70 can be generated.

Here, a disadvantage involved in the frame transfer performed in a state that the information charges are remained in the storage section will be described. In this case, information charge remained in the storage section is also vertically transferred in association with the frame transfer and transferred to the horizontal transfer section. Because the horizontal transfer section is not being driven at this time, a plurality of horizontal lines are accumulated in the horizontal transfer, which might therefore overflow. Overflowing information charges could leak into the storage section and mix with information charges of a new image, disadvantageously deteriorating the quality of a new image. This problem can, however, be solved by employing the storage section reset operation described above.

Figure 6:
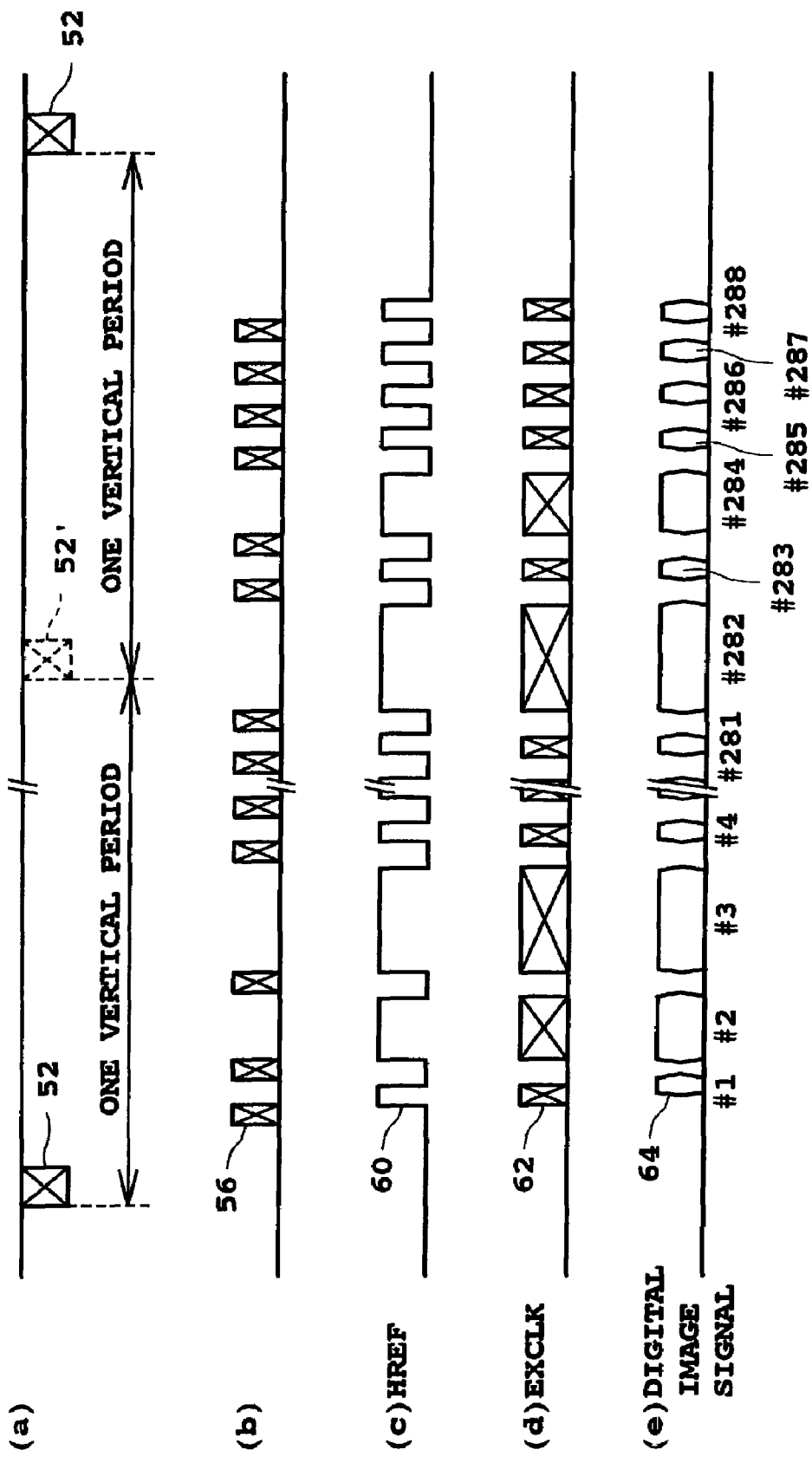
FIG. 6 is a timing chart illustrating an image take-in priority mode as a second example operational mode according to the embodiment of the present invention.

FIG. 6 is a timing chart illustrating an image capture priority mode as a second example operation of an application of the image sensor 2. FIG. 6(a) shows the clockpulse 52 for the frame transfer, FIG. 6(b) shows the clock pulse 56 for the horizontal transfer, FIG. 6(c) shows the HREF pulse 60, FIG. 6(d) shows the external clock EXCLK 62, and FIG. 6(e) shows the digital picture signal 64. In FIG. 6, all the horizontal lines are 288.

This operation mode prioritizes the operations for transferring the image stored in the storage section to the external system over the operations for frame transfer. Specifically, when all the horizontal lines cannot be output from the CCD image sensor 4 in a single vertical scanning period, a frame transfer clock pulse 52' which is originally generated is suppressed. More specifically, the image sensor control circuit 20 counts the vertical scanning period according to the internal clock, and, in the normal state, generates the frame transfer clock pulse 52 for every cycle of the vertical scanning period, but, when a suppression signal is received from the digital signal processing circuit 26, the image sensor control circuit 20 does not generate a transfer clock pulse even at the normal time for performing frame transfer for every vertical scanning period. The image sensor control circuit 20 repeats the line feed transfer and the horizontal transfer, to continue the operation of outputting the horizontal lines one at a time in single line units from the CCD image sensor 4. The line feed transfer and the horizontal transfer are performed in synchronization with the operation that the external system reads the image data stored in the line memory 30 according to the EXCLK in the same manner as earlier described.

When the frame transfer clock pulse 52' is not generated, the digital signal processing circuit 26 does not generate a corresponding VREF pulse. Thus, the external system does not determine that the image has been changed and continues to retrieval horizontal lines from the image sensor 2.

When the digital signal processing circuit 26 detects that the output of all the horizontal lines has been completed, it does not generate a suppression signal for the next frame transfer. Thus, the image sensor control circuit 20 generates the normal frame transfer clock pulse 52 when frame transfer is to be performed.

According to the image sensor of the present invention, the line memory is used as a buffer to reduce the effects of differences in timing between the output operation of the information charges from the solid-state image sensor and the operation to retrieve image data executed by the external equipment. In order to mitigate the effects of the difference of timing, the line memory, and not the frame memory, is used. As such, a low cost, compact, and energy efficient image sensor can be produced. In other words, a small memory can be used to read image data from the external equipment by an asynchronous clock.

While there has been described what is at present considered to be the preferred embodiment of the invention, it is to be understood that various modifications may be made thereto, and it is intended that the appended claims cover all such modifications as fall within the true spirit and scope of the invention.

What is claimed is:

1. An image sensor, comprising:
a solid-state image sensor which includes an image pickup section comprising a plurality of light receiving pixels arranged in matrix which accumulates information charges generated by the respective light receiving pixels in response to incident light forming an object image, a vertical transfer section which receives and stores information charges accumulated in the respective light receiving pixels of the image pickup section in units of single screen and then transfers the charges in a vertical direction in units of one line, and a horizontal transfer section which transfers in a horizontal direction and outputs the information charges output from the vertical transfer section;
an image sensor control circuit for controlling the operation of the solid-state image sensor;
a line memory for storing according to an internal clock, in units of one line, image data corresponding to picture signal output from the solid-state image sensor;
a memory control circuit for reading the image data, which is to be stored in the line memory, one pixel at a time according to an external clock supplied from an external equipment and outputting the image data to the external equipment, supplying, stopping, and resupplying of the external clock being controlled in accordance with the state of the external equipment; and
a register in which a parameter that designates a read-out range is set; wherein
the memory control circuit reads a designated range of image data from the line memory according to the parameter set in the register.

2. The image sensor according to claim 1, wherein the memory control circuit reads a designated range of image data according to the designated parameters, stored as a single unit in the line memory.

3. The image sensor according to claim 1, wherein
the memory control circuit outputs a read-out state signal which indicates whether or not the memory control circuit is at that time reading a horizontal line of image data contained in the designated range; and
the image sensor control circuit suspends the vertical transfer section and the horizontal transfer section from performing transfer operations when the line read-out state signal indicates that it is reading data.

4. The image sensor according to claim 1, wherein the sensor control circuit discharges the information charges remaining in the vertical transfer section when the output to the external equipment of all horizontal lines of the image data contained in the designated range in the single screen has not been completed within a predetermined frame rate.

5. The image sensor according to claim 1, wherein the image sensor control circuit stops the transfer of information charges from the image pickup section to the vertical transfer section when the output to the external equipment of all horizontal lines of the image data contained in the designated range in the single screen has not been completed within a predetermined frame rate.

6. The image sensor according to claim 1, wherein the memory control circuit controls the reading out of the horizontal lines contained in the designated range in the single screen according to the clock supplied from the external equipment.

* * * * *